Sept. 10, 1963 S. NOVICK ETAL 3,103,597

BISTABLE DIODE SWITCHING CIRCUITS

Filed July 12, 1960 2 Sheets-Sheet 1

INVENTORS
SHELDON NOVICK &
LAMAR N. REED
BY John V. Regan
ATTORNEY

INVENTORS
SHELDON NOVICK &
LAMAR N. REED
BY John V. Regan
ATTORNEY 3,103,597
BISTABLE DIODE SWITCHING CIRCUITS Sheldon Novick, Camden, and Lamar N. Reed, Pennsauken, N.J., assignors, by mesne assignments, to the United States of America as represented by the Secretary of the Air Force Filed July 12, 1960, Ser. No. 42,321
2 Claims. (Cl. 307—88.5)

This invention relates to switching circuits and to novel means for triggering said circuits. More particularly, this invention relates to novel bistable switching circuits, and to circuits and systems employing such bistable circuits.

A bistable circuit may be defined as a circuit which has two distinct and stable operating states. Such a circuit remains in either of its stable states until it is switched to the other stable state as, for example, by an input pulse of the proper polarity and suitable amplitude. Bistable circuits are used extensively in circuits such as shift registers, ring counters, scalers and the like.

Many bistable circuits of the prior art require two active elements and related components per stage. Also, a serious disadvantage of many prior art bistable circuits is undesirable loading of the information stage which either supplies the switching pulse or which effects steering of the switching pulses provided from an external source.

It is an object of this invention to provide an improved bistable switching circuit which does not suffer the above disadvantages.

It is another object of this invention to provide an improved bistable switching circuit which has a single active element per stage.

It is still another object of this invention to provide improved switching means for a bistable circuit, which means has a reduced loading effect on the information signal source.

It is a further object of this invention to provide an improved bistable circuit which has low power requirements and which is capable of operating at high speed.

A further object of the present invention is to provide a novel bistable switching circuit of the type described wherein the sole active element thereof is a two-terminal device having a negative resistance region in its operating characteristic.

A still further object of this invention is to provide shift circuits which employ bistable circuits of the type described above.

These and other objects are accomplished according to one embodiment of the invention by a switching circuit having an input terminal, a junction point operatively connected to said input terminal, a pair of unilateral conducting devices for normally coupling pulses of opposite polarity simultaneously to said point, and means for applying a selected direct current voltage to said point to forward bias one or the other of said unilateral devices.

Figure 1:
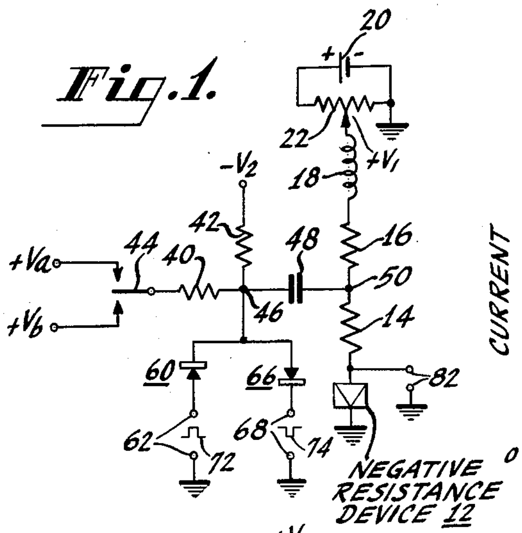
FIGURE 1 is a schematic diagram of one form of bistable switching circuit in accordance with the invention.

The switching circuit illustrated schematically in FIGURE 1 may be considered essentially as comprising a bistable circuit portion and a pulse input or switching portion. The bistable portion of the arrangement comprises the series combination of an active element 12, which may be a negative resistance device, a first resistance element 14, a second resistance element 16, and an inductor 18. The series combination is energized by a direct current voltage source, which may take the form of a battery 20 with a resistor 22 connected thereacross. The negative terminal of the battery 20 is connected to circuit ground, as is one terminal of the negative resistance device 12. The upper end of the inductor 18 is connected to a slidable tap on the biasing resistor 22, and the tap is adjusted to provide a voltage of $+V_1$ volts across the series combination.

The negative resistance device 12 may be, for example, a negative resistance diode of the type described in the article by H. S. Sommers, Jr., in the Proceedings of the IRE, July 1959, at page 1201, and in other publications, and known generally in the art as a "tunnel diode." In this event, the grounded terminal of the negative resistance device 12 of FIGURE 1 is the cathode, and the ungrounded terminal is the anode. The characteristics of such negative resistance diodes are set forth in detail in the article aforementioned and will not be described further except as may be necessary to describe the operation of the FIGURE 1 circuit.

Figure 2:
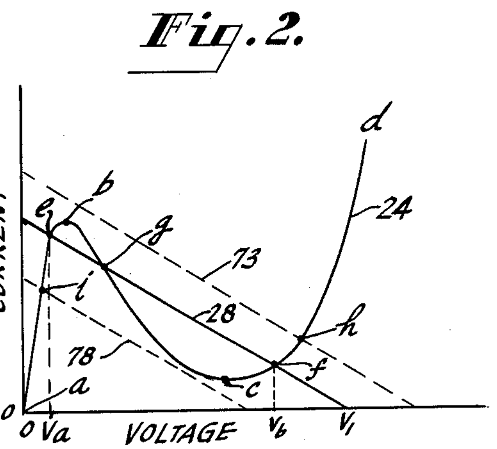
FIGURE 2 is a volt-ampere characteristic curve of one type of negative resistance device suitable for use as the active element of a bistable circuit.

The negative resistance diode has a volt-ampere characteristic of the general form illustrated graphically by the characteristic curve 24 of FIGURE 2. The characteristic curve 24 has two regions *ab* and *cd* of positive resistance and a region *bc* of negative resistance. More particularly, the increment $\Delta V/\Delta I$ has a positive value in the positive resistance regions *ab* and *cd* and a negative value in the region *bc* of negative resistance. Voltage is plotted along the abscissa, and current is plotted along the ordinate in FIGURE 2.

The values of the resistance elements 16 and 14 (FIGURE 1) are selected to provide the load line 28 of FIGURE 2 when the energizing voltage for the circuit is $+V_1$ volts. This load line 28 intersects the characteristic curve 24 of the negative resistance device 12 at points *e*, *f*, and *g*. The points *e* and *f* of intersection in the regions of positive resistance *ab* and *cd*, respectively, are stable operating points; the point *g* of intersection in the region *bc* of negative resistance is an unstable operating point. The two stable operating points *e* and *f* may have particular significance depending upon circuit application. In computer applications, for example, the point *e* of low voltage and high conduction may correspond to storage of a binary "zero"; the point *f* of high voltage and low conduction may correspond to storage of a binary "one." It is to be noted that the ratio of $V_b$ to $V_a$ is large, say 5 to 15, although the voltage values themselves may be quite small.

Assuming that initially the negative resistance device 12 is in the low voltage state, corresponding to the operating point *e*, the device 12 may be switched to the high voltage state by increasing temporarily the current through the device 12 to a value such that the current exceeds that corresponding to the transition point *b*. The device 12 then switches rapidly through the region of negative resistance and settles eventually at the stable operating point *f* when the switching current is removed. The device 12 may be switched back to the low voltage state by decreasing temporarily the current through the device 12 to a value less than that corresponding to the transition point *c*. The device 12 then switches rapidly through the region of negative resistance and settles at the stable operating point *e* when the switching current terminates. The mechanism for switching the FIGURE 1 circuit will now be described.

The pulse input or switching portion of the FIGURE 1 circuit includes a voltage divider comprising resistance elements 40 and 42 serially connected between a source of D.C. energizing potential, designated $-V_2$, and a movable switch arm 44. The voltage divider has an intermediate junction point 46 which is operatively connected by a coupling element, illustrated as a capacitor 48, to the bistable circuit. The capacitor 48 may be connected, as shown, to a point 50 common to one end of each of the resistance elements 14, 16 in the bistable circuit. For purposes of later discussion, this point 50 may be termed the "input terminal" of the bistable circuit. It will be recognized that the separate resistors 14, 16 actually may be replaced by a single resistor having an intermediate tap 50.

A first unilateral conducting device, illustrated as a diode 60, has its cathode electrode connected to the aforementioned junction point 46 of the voltage divider. The anode of diode 60 is connected to one of a pair of input terminals 62, the other terminal being connected to ground. A second unilateral conducting device 66 has its anode electrode connected to the junction point 46 of the voltage divider. The cathode of this device 66 is connected to one of a second pair of pulse input terminals 68, the other terminal thereof being connected to ground. The diodes 60, 66 are oppositely poled with respect to the junction 46 and are poled front-to-back with respect to each other. Positive pulses 72 are applied selectively at the input terminals 62 from a pulse source (not shown). Negative pulses 74 are applied simultaneously at the other input terminals 68. The pulses 72, 74 are of such polarity as to normally tend to forward bias their respective diodes 60, 66. Assuming that these pulses are of equal amplitude, the pulses cancel one another so that the voltage at the junction point 46 is 0 volts in the absence of any voltage applied across the ends of the voltage divider, or when the direct current energizing voltage across the voltage divider is such that the D.C. potential at the junction point 46 is zero. In practice, the switch arm 44 may be connected to a D.C. operating potential of either $+V_a$ or $+V_b$ volts.

The values of the resistance elements 40, 42 of the voltage divider are selected so that the normal D.C. voltage at the junction point 46 is negative when a voltage $+V_a$ is connected to the switch arm 44, and is positive when the switch arm 44 is connected to a voltage source $+V_b$. For purposes which will be more fully apparent hereinafter, the voltages $+V_a$ and $+V_b$ correspond to the voltages illustrated in FIGURE 2. Diode 60 is forward biased when the voltage at the junction point 46 is negative with respect to ground. Under these circumstanecs, positive input pulse 72 is coupled by the capacitor 48 to the bistable circuit and appears to the negative resistance device 12 as a current pulse because of the resistance element 14. The values of the capacitor 48 and resistance element 14 are selected so that the time constant of this combination is long with respect to the duration of the input pulse 72; thereby preventing differentiation of the pulse 62. The inductor 18, although not necessary to the operation of the circuit, enhances switching operation by providing a high impedance to the input pulse 72 and thereby allowing the switching power to be transferred to the negative resistance diode 12 substantially in its entirety.

Assuming that the negative resistance device 12 is in the low voltage operating state, corresponding to point *e*, when the pulse 72 is applied, the increase in current through the negative resistance device 12 switches the negative resistance device 12 to the high voltage state. Switching through the region of negative resistance may occur; for example, along the dashed load line 73 to the point *h* of intersection with the positive resistance region *cd*. Current through the negative resistance device 12 then decreases along the characteristic curve 24 to the stable operating point *f* when the input pulses 72, 74 terminate. Further switching pulses 72, 74 provide no switching of the negative resistance device 12 so long as the switch arm 44 is connected to a source of $+V_a$ volts. Instead, the negative resistance device 12 operates along the portion *fd* of the characteristic curve 24. The diode 66 is reverse biased and prevents the pulses 74 from reaching the junction point 46.

Assume now that the switch arm 44 is thrown in the downward position for connection to a source of D.C. voltage of $+V_b$ volts. The voltage at the junction point 46 is now positive with respect to ground and the diode 66 is then forward biased. Input pulses 72, 74 are again applied simultaneously and selectively at the input terminals 62, 68, respectively. The negative going pulse 74 is passed by the forward biased diode 66 and coupled by the capacitor 48 to the input terminal 50 of the bistable circuit. Current flowing through the negative resistance device 12 is reduced temporarily to a value less than that corresponding to the transition point *c*, and the device 12 switches to the low voltage state, for example along the dashed load line 78, to the point of intersection *i* with the positive resistance region *ab*. Current through the device 12 increases along the characteristic curve 24 to the stable operating point *e* as the energy in the inductor 18 is dissipated. The positive pulses 72 are now blocked by the reverse biased diode 60.

In a typical example, the components of the circuit of FIGURE 1 may have the following values:

$+V_1=0.35$ volt
$-V_2=-10$ volts
$V_a=0.05$ volt
$V_b=0.25$ volt
Resistor 40=1K ohm
Resistor 42=100K ohms
Inductor 18=5 $\mu$henries
Capacitor 48=1,000 $\mu\mu$farads
Resistor 16=27 ohms
Resistor 14=68 ohms It may be seen from the above example that the switching power is derived primarily from the switching pulses 72 or 74 and that the control voltages $V_a$ and $V_b$ may be very small in magnitude. It may also be seen that there is very little loading on the voltage sources $V_a$ and $V_b$ because of the high impedance of the switching network. In actual practice the control voltage $V_a$ or $V_b$ may be the output voltage of an information handling circuit such as another bistable circuit, logic circuit or the like, where overloading is undesirable. In this event, of course, the control voltages $V_a$ and $V_b$ are generally derived from a common output terminal of the preceding circuit, and the switch 44, included for illustrative purposes only, is unnecessary. As will be apparent from the FIGURE 4 circuit, the resistor 42 and voltage source $-V_2$ may be eliminated when the voltages $V_a$ and $V_b$ are negative and positive, respectively.

Figure 3:
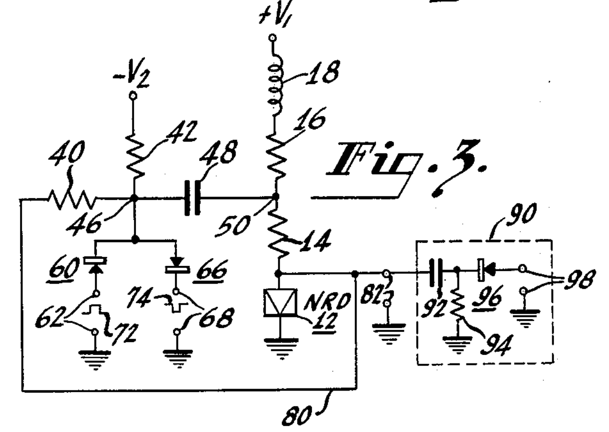
FIGURE 3 is a schematic diagram of a "scale of two" circuit.

FIGURE 3 is a schematic diagram of a circuit which is essentially similar to the FIGURE 1 circuit described above. Like components are designated by like reference characters. The FIGURE 3 circuit is designed to operate as a bistable trigger circuit and may be used, for example, as a "scale of two" circuit. The anode of the negative resistance device 12 is connected by line 80 to one end of resistor 40 in the voltage divider circuit and is also connected to one of a pair of output terminals 82. The voltage across the negative resistance device 12 is either $+V_a$ or $+V_b$ volts, as may be seen by referring to FIGURE 2. The voltage at the left-hand terminal of resistor 40, therefore, is either $+V_a$ or $+V_b$ volts. Assuming that the negative resistance device 12 is in the low voltage state, the voltage at the junction point 46 is negative and the diode 60 is forward biased. When the switching pulses 72, 74 are applied at the terminals 62, 68, respectively, the positive pulse 72 is coupled by the capacitor 48 to the input terminal 50 of the bistable circuit. This pulse, as described previously, is effective to switch the negative resistance device 12 to the high voltage state. The voltage across the negative resistance device 12 is then $+V_b$, and the voltage at the junction point 46 is positive with respect to ground. When the switching pulses 72, 74 are next applied, the negative going pulse 74 is coupled by the capacitor 48 to the input terminal 50 and the negative resistance device is switched back to the low voltage state. An arrangement similar to that illustrated within the dashed box 90 may be connected at the output terminals 82 when it is desired to operate the FIGURE 3 circuit as a scale of two circuit. The capacitor 92 and resistor 94 serve to differentiate the output signal appearing across the terminal 82. The diode 96 allows only the negative peak of the differentiated signal to appear at the output terminals 98.

Figures 4, 5:
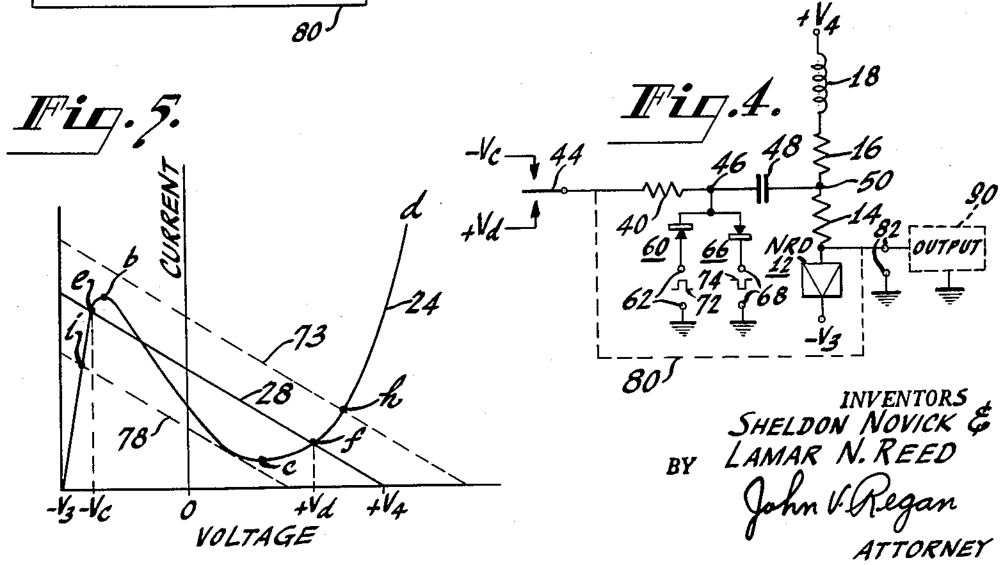
FIGURE 4 is another embodiment of a bistable switching circuit according to the invention.
FIGURE 5 is a characteristic curve useful in explaining the FIGURE 4 circuit.

Another embodiment of a bistable switching circuit according to the invention is illustrated schematically in FIGURE 4. A volt-ampere characteristic useful in explaining the operation of the FIGURE 4 circuit is illustrated graphically in FIGURE 5. The general similarities of FIGURES 4 and 5 to FIGURES 1 and 2 will be apparent, and like reference components are designated by like reference characters.

In the FIGURE 4 circuit, the cathode of the negative resistance device 12 is connected to a source of voltage, designated $-V_3$. The upper end of the inductor 18 is energized from a voltage source, designated $+V_4$. These values of voltage have the significance indicated in FIGURE 5. The quantity $(V_4-V_3)$ is equal to the quantity $V_1$ (FIGURE 1). The effect of so changing the bias values is to shift the zero volt ordinate of the volt-ampere curve to the right an amount equal to $V_3$ volts. In consequence thereof, the voltage at the anode of the negative resistance device is $-V_c$ when the device is in the low voltage state, and is $+V_d$ when the device 12 is in the high voltage state. The voltage values then may be as follows in a typical example:

$$V_4=0.20 \text{ volt}$$
$$-V_3=-0.15 \text{ volt}$$
$$-V_c=-0.10 \text{ volt}$$
$$V_d=0.10 \text{ volt}$$

Operation of the bistable portion of the FIGURE 4 circuit is the same as that of the FIGURE 1 circuit and need not be described further. The switching portion of the circuit is different in that the resistor 42 and bias source $-V_2$ are eliminated. The switch arm 44 may be connected selectively to either of the sources of voltage $-V_c$ and $+V_d$. These voltages have the significance indicated in FIGURE 5. The voltage at the junction point 46 is the same as that applied at the switch arm 44 in the quiescent condition.

A voltage of $-V_c$ at the junction 46 forward biases the diode 60 and reverse biases the diode 66. A positive pulse 72 is then passed by the capacitor 48 to the input terminal 50 when the switching pulses 72, 74 are applied. A voltage of $+V_d$ is present at the junction point 46 when a voltage of $+V_d$ is present at the switch arm 44. This voltage reverse biases the diode 60 and forward biases the diode 66. Consequently, a negative pulse 74 is passed by the capacitor 48 to the input terminal 50 when the switching pulses 72, 74 are applied.

The FIGURE 4 circuit may be operated as a trigger circuit by connecting the anode of the negative resistance device 12 to the left-hand end of the resistor 40 in the switching network. Connection may be made by the dotted line 80, for example. In this event, of course, the switch arm 44 is not connected to either $-V_c$ or $+V_d$ and may, in fact, be eliminated. The FIGURE 4 circuit requires less components than the FIGURE 1 circuit and is preferable in that sense. In actual practice, however, the FIGURE 1 circuit may sometimes be more convenient to use, especially in those cases when the small biasing source $-V_3$ is not conveniently available. The circuit within the dashed box 90 of FIGURE 3 may be connected across the output terminals 82 when it is desired to operate the FIGURE 4 circuit as a scale of two circuit.

Switching circuits such as shift registers and ring counters may be constructed by cascading stages of the type shown in either FIGURE 1 or FIGURE 4. A four stage shift register embodying the principles of the FIGURE 1 circuit is illustrated schematically in FIGURE 6. The bistable circuit portions of the four stages are generally similar except for the arrangement of the elements thereof. Corresponding elements of stages 1 . . . 4 are designated by reference numerals followed by the letters "*a*" . . . "*d*," respectively. The bistable circuit portion of the first stage comprises a negative resistance diode 12*a* of the type described hereinabove, and referred to hereinafter for purposes of convenience as a bistable device. The cathode of the bistable device 12*a* is connected to a point of reference potential illustrated as circuit ground. The anode is connected through resistors 14*a* and 18*a* to a source of energizing potential designated $+V_1$. This circuit may also include an inductor as illustrated in FIGURE 1, although the inclusion of such an element is not essential. The bistable circuit portion of stage 3 is the same as that of stage 1.

The bistable circuit portions of stages 2 and 4 are the same as each other, and a description of the stage 2 circuit is deemed sufficient. This bistable circuit portion comprises a resistor 18*b* having one end connected to circuit ground. The other end of this resistor 18*b* is connected through a resistor 14*b* to the cathode of a bistable device 12*b*, the anode of which is connected to $+V_1$ volts. Other differences between the odd and even numbered stages will be apparent from the discussion which follows.

All of the bistable devices 12*a* . . . 12*d* assume the low voltage stable state when the shift register is energized initially because of the characteristics of these devices. It may be seen from the graph of FIGURE 2 that the current flowing through a bistable device is high when the device is in the low voltage stable state, and is low (relatively speaking) when a bistable device is in the high voltage stable state. Accordingly, the voltages at points *k* and *m* at the anodes of bistable devices 12*a* and 12*c*, respectively, are low and have a value of $+V_a$ volts at this time.

The voltages at points *l* and *n* at the respective cathodes of bistable devices 12*b* and 12*d* are relatively high at this time because of the heavy conduction through the resistors in series with these devices. The voltages at *l* and *n* may be, for example, on the order of $+V_b$ volts. In any event, the values of the resistors 40*c* and 42*c* may be suitably chosen so that the voltage at point 46*c* is positive and negative when bistable device 12*b* is in the low voltage and high voltage states, respectively.

The low voltage stable state of a bistable device may correspond to storage of a binary "zero"; the high stable state may correspond to storage of a binary "one." Initially, therefore, all of the stages are storing binary "zeros." Let it be desired to enter the binary number 1101 serially into the shift register. A binary "one" is entered into the first stage by applying a voltage $V_a$ across the input terminals 100. Ordinarily, a signal or level of $V_a$ corresponds to a binary "zero" in the system. However, the input at terminals 100 may be the binary complement of the output of the information output of signal source (not shown). The voltages at the voltage divider junction points 46*a*, 46*b* and 46*d* are negative with respect to ground at this time, while the voltage at the junction joint 46*c* is high. In response to the first applied set of shift pulses 72, 74, position pulses are passed by capacitors 48*a*, 48*b* and 48*d*. A negative pulse is passed by the remaining capacitor 48*c*.

The positive pulse passed by the first capacitor 48*a* is effective to trigger the bistable device 12*a* of stage 1 to the high voltage state, corresponding to storage of a binary "one." The positive pulses 72 passed by the second capacitor 48*b* and the fourth capacitor 48*d*, however, do not switch the bistable devices 12*b* and 12*d* to the high voltage state inasmuch as current through these bistable devices 12*b* and 12*d* actually is temporarily reduced. The negative pulse 74 passed by the third capacitor 48*c* results in a temporary decrease in current through the bistable device 12*c* of the third stage, and this bistable element therefore is not switched to the high voltage state. The shift register stores the binary number 1000 at this time.

The next binary digit to be entered into the shift register is a binary "zero." A voltage $V_b$ is applied across the input terminals 100. The voltages at the voltage divider junction points 46*a*, 46*b* and 46*c* are high at this time. The voltage at the junction point 46*d* at the input of the fourth stage is low. In response to the next set of shift pulses, negative pulses 74 are passed by capacitors 48*a*, 48*b* and 48*c*, and a positive pulse 72 is passed by capacitor 48*d*. The negative pulse passed by first capacitor 48*a* is effective to switch the bistable device 12*a* of stage 1 back to the low voltage state. The negative pulse passed by the capacitor 48*b* at the input of the second stage results in an increase in current flow through the bistable device 12*b*, which current increase is sufficient in magnitude to switch the bistable device 12*b* of stage 2 to the high voltage stable state. The negative pulse passed by the third capacitor 48*c* at the input of stage 3 causes a temporary decrease in current flow through the bistable device 12*c*, and this device 12*c* remains in the low voltage state. The positive pulse 72 passed by the capacitor 48*d* at the input of the fourth stage is ineffective to switch the bistable device 12*d* to the high voltage state for the reasons previously described. The shift register is now storing the binary number 0100.

The next binary digit to be entered into the shift register is a binary "one." A voltage $V_a$, therefore, is applied at the input terminals 100. The voltage at the voltage divider junction points 46*a* . . . 46*d* are low at this time. Therefore, all of the capacitors 48*a* . . . 48*d* pass positive pulses when the next set of shift pulses 72, 74 is applied. The positive pulse passed by first capacitor 48*a* switches the bistable device 12*a* to the high voltage state. The positive pulse passed by the second capacitor 48*b* results in a decrease in current flow through the bistable device 12*b* of stage 2, and causes this bistable device 12*b* to switch from the high to the low voltage stable state. The positive pulse passed by the third capacitor 48*c* causes an increase in current flow through the bistable device 12*c* of sufficient magnitude to switch the bistable device 12*c* to the high voltage state. The positive pulse passed by the fourth capacitor 48*d* is again ineffective to switch the bistable device 12*d* of the fourth stage to the high voltage state. The binary number 1010 is now stored in the shift register.

To enter the next binary "one" into the shift register, a voltage $V_a$ is applied at the input terminals 100. The voltages at the divider junction points 46*b*, 46*c* and 46*d* are high at this time. The voltage at the voltage divider junction point 46*a* is negative. When the next set of shift pulses 72, 74 is applied at the shift input terminals 62, 68, respectively, a positive pulse is passed by the first capacitor 48*a* to the input terminal 50*a* of the first stage. This pulse increases slightly the current flowing through the bistable device 12*a*. However, since this bistable device 12*a* is already in the high voltage state, no switching occurs in the first stage. The negative pulse passed by the second capacitor 48*b* results in an increase of current through the bistable device 12*b* of the second stage and is of sufficient magnitude to shift this bistable device 12 to the high voltage state. The negative pulse passed by the capacitor 48*c* reduces current flow through the bistable element 12*c* below the transition point and causes this bistable device 12*c* to switch to the low voltage state. The negative pulse passed by the capacitor 48*d* causes an increase in current flow through the bistable device 12*d* of the fourth stage. This increase of current causes the bistable element 12*d* to switch to the high voltage state. The desired binary number 1101 is now stored in the shift register.

One of a pair of output terminals 102 is connected to the cathode of the bistable device 12*d* of the fourth stage. The other terminal of this pair 102 is connected to ground. Information stored in the shift register may be read out serially at the output terminals 102 by applying further sets of shift pulses 72 at the shift terminals 62, 68. As is well known in the art, information may also be read out of the shift register in parallel form by connecting other output terminals at the points *k*, *l*, and *m*, if such readout is desired. Information may also be entered into the shift register in parallel form in accordance with techniques known in the art such as by applying suitable voltages at the junction points 46*a* . . . 46*d*. The particular number of shift register stages illustrated in FIGURE 4 is arbitrarily chosen for illustrative purposes only, and it will be understood that any other number of stages may be cascaded as circumstances dictate.

The basic bistable circuit and pulse input network of FIGURE 1 or FIGURE 4 also may provide the basic building block of a ring counter. One form of ring counter embodying the FIGURE 1 circuit is illustrated schematically in FIGURE 7. A unique feature of this ring counter is that only *n* stages are required to provide an output indication after 2*n* input signals. Another feature, which may be advantageous in certain applications, is that an even number of input signals are required to provide an output. The particular embodiment of FIGURE 7 includes three cascaded bistable stages.

Figure 6:
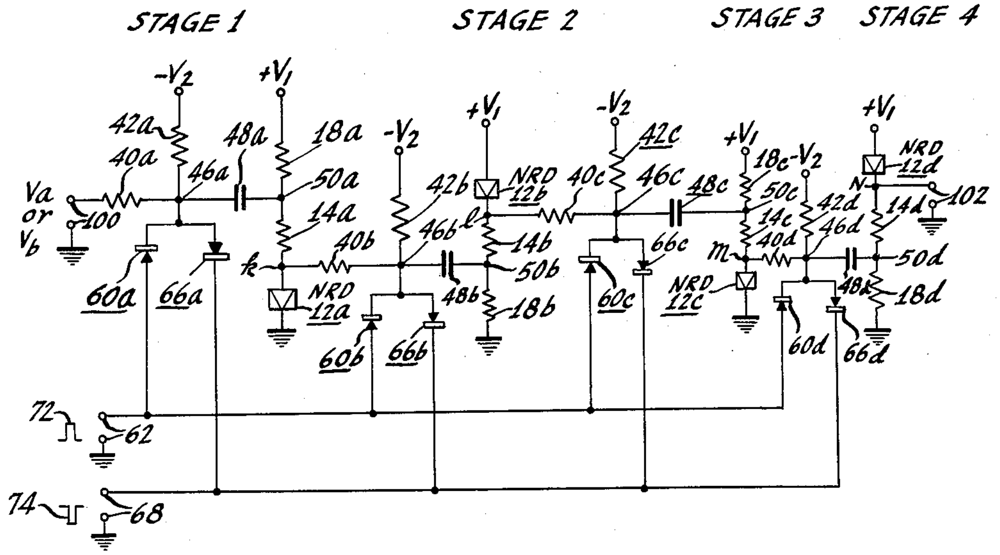
FIGURE 6 is a four stage shift register according to the invention.

The ring counter is similar generally to the shift register of FIGURE 6 previously described with the following exceptions. The anode of the bistable device 12*c* of the third stage is connected by way of a line 106 to one end of the voltage divider resistor 40*a* for feedback purposes. In addition, an output or utilization device is connected at the output terminal of each stage. For example, an output device 90*a* is connected between the anode of the bistable device 12*a* of stage 1 and circuit ground. Similar output devices are connected in the other stages. The output devices 90*a* . . . 90*c* may be of the type illustrated with the dashed box 90 of FIGURE 3, and each provides an output when the input thereto receives a negative-going pulse.

The operation of the ring counter is similar generally in operation to the shift register of FIGURE 5. The main difference is in the effect of the feedback from the output of the last stage to the input of the first stage. All of the bistable devices 12*a*, 12*b*, 12*c* assume the stable state of low voltage when the ring counter is energized initially. The voltages at points *k* and *m* are then low ($+V_a$) and the voltage at point *l* is high ($\approx +V_b$). The effect on the voltages at these points *k*, *l* and *m* in response to successive sets of shift pulses 72, 74 simultaneously applied to all stages may be seen best from the following table, wherein "H" and "L" denote high and low voltage, respectively, the "–" indicates the initial condition, and the "*" denotes the occurrence of an output from the output device 90*a*, 90*b* or 90*c*.

| Shift Pulses | $V_k$ | $V_l$ | $V_m$ |
|---|---|---|---|
| – | L | H | L |
| 1 | H | H | L |
| 2 | H | *L | L |
| 3 | H | L | H |
| 4 | *L | L | H |
| 5 | L | H | H |
| 6 | L | H | *L |
| 7 | H | H | L |
| 8 | H | *L | L |
| 9 | H | L | H |
| 10 | *L | L | H |
| 11 | L | H | H |
| 12 | L | H | *L |

It may be seen from the above table that the output device 90_a_ provides an output in response to the fourth set of shift pulses and each 6N sets of shift pulses thereafter, where N is any integer. The second output device 90_b_ provides an output in response to the second set of shift pulses and in response to every 6N sets of shift pulses thereafter. The third output device 90_c_ provides an output in response to the sixth set of shift pulses and in response to every 6N sets of shift pulses thereafter.

Figure 7:
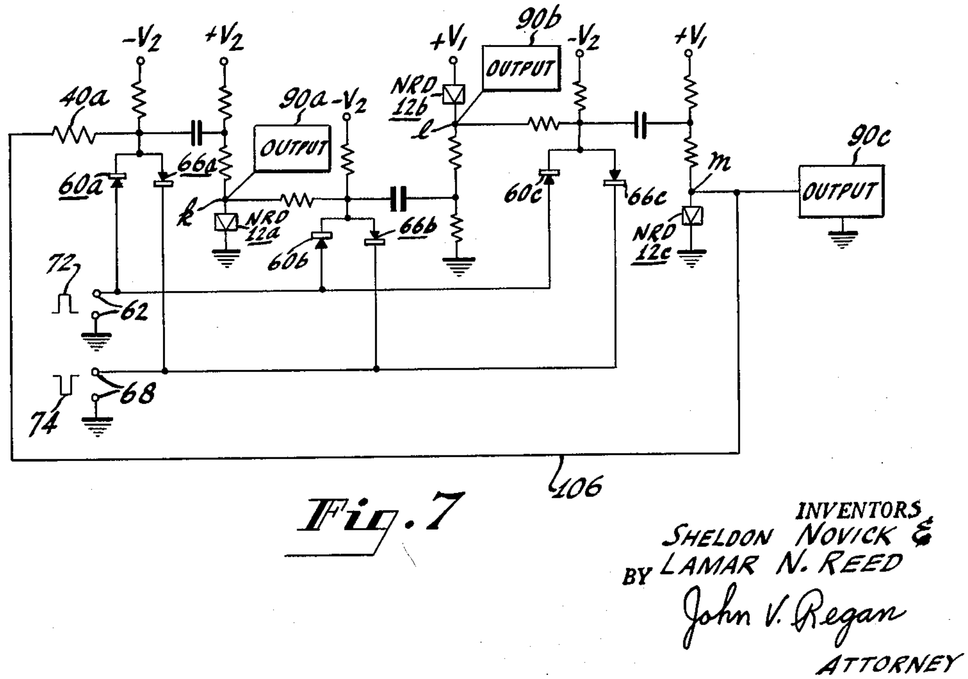
FIGURE 7 is a ring counter according to the invention.

The particular number of stages shown in FIGURE 7 is by way of illustration only. A different number of stages may be cascaded as circumstances require.

What is claimed is:

1. A bistable switching circuit comprising:
a pair of input terminals;
a pair of oppositely poled unilateral conducting devices connected between said terminals;
a voltage divider comprising two resistance elements;
means connecting the junction point between said resistance elements to the junction point between said unilateral conducting devices;
a source of negative direct current voltage;
means connecting the opposite end of a first one of said resistance elements to said source of negative direct current voltage;
a two-terminal device having a region of negative resistance in its operating characteristic;
a source of positive direct current voltage;
an inductor connected at one end to said source of positive direct current voltage;
a resistor having end terminals and an intermediate tap;
means connecting the end terminals of said resistor respectively to said inductor and a first terminal of said two-terminal device;
capacitor means for coupling the junction point between said unilateral conducting devices to said intermediate tap;
means connecting said first terminal of said two-terminal device to an output terminal and to the opposite end of the second one of said resistance elements of said voltage divider;
means connecting the second terminal of said two-terminal device to a reference potential and
means for simultaneously applying switching pulses of opposite polarity to said input terminals.

2. A bistable switching circuit comprising:
a pair of input terminals;
a pair of oppositely poled unilateral conducting devices connected between said terminals;

a voltage divider comprising two resistance elements;
means connecting the junction point between said resistance elements to the junction point between said unilateral conducting devices;
a source of negative direct current voltage;
means connecting the opposite end of a first one of said resistance elements to said source of negative direct current voltage;
a two-terminal device having a region of negative resistance in its operating characteristic;
a source of positive direct current voltage;
an inductor connected at one end of said source of positive direct current voltage;
a resistor having end terminals and an intermediate tap;
means connecting the end terminals of said resistor respectively to said inductor and a first terminal of said two-terminal device;
capacitor means for coupling the junction point between said unilateral conducting device to said intermediate tap;
a differentiating circuit;
means connecting said first terminal of said two-terminal device to the input of said differentiating circuit;
a third unilateral conducting device;
means connecting said third unilateral conducting device between the output of said differentiating circuit and an output terminal;
means connecting said first terminal of said two-terminal device to the opposite end of the second one of said resistance elements of said voltage divider;
means connecting the second terminal of said two-terminal device to a reference potential and
means for simultaneously applying switching pulses of opposite polarity between said input terminals and said reference potential.

References Cited in the file of this patent

UNITED STATES PATENTS

| | | |
|---|---|---|
| 2,910,596 | Carlson | Oct. 27, 1959 |
| 2,988,701 | Clapper | June 13, 1961 |

OTHER REFERENCES

Application of Tunnel Diodes, by Lewin et al. in 1960 International Solid-State Circuit Conference, February 10, 1960, pages 16–17 (FIG. 6).